Jan. 8, 1952
Y. H. KURKJIAN
2,582,044
AUTOMATIC INDICATING MEANS FOR
PHOTOGRAPHIC FILM HOLDERS
Filed June 16, 1949
2 SHEETS—SHEET 1
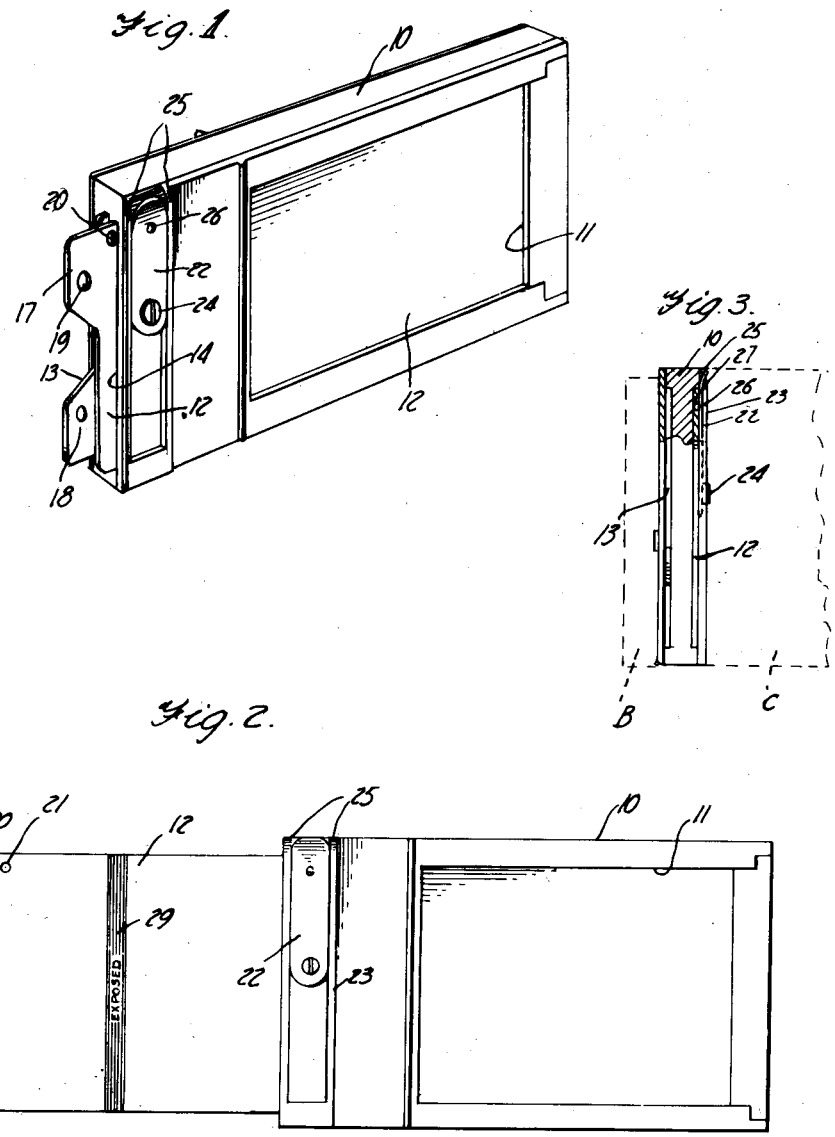
INVENTOR.
YERVANT H. KURKJIAN
BY
HIS ATTY.

Jan. 8, 1952   Y. H. KURKJIAN   2,582,044
AUTOMATIC INDICATING MEANS FOR
PHOTOGRAPHIC FILM HOLDERS

Filed June 16, 1949   2 SHEETS—SHEET 2

INVENTOR.
YERVANT H. KURKJIAN
BY
HIS ATTY.

Patented Jan. 8, 1952

2,582,044

UNITED STATES PATENT OFFICE 2,582,044

AUTOMATIC INDICATING MEANS FOR PHOTOGRAPHIC FILM HOLDERS

Yervant H. Kurkjian, Clifton, N. J.

Application June 16, 1949, Serial No. 99,518

1 Claim. (Cl. 95—71)

This invention relates to a film holder for cameras, and has for one of its objects the production of a simple and efficient means for locking the film shielding plate in selected adjusted positions within the film holder and to thereby indicate whether or not the film has been exposed.

Another object of this invention is the production of a film holder and means for adjustably locking the shielding plate in one selected position to indicate that the film has not been exposed, a second selected position to indicate that the film is exposed while taking a picture, and a third position to indicate that the film has been exposed.

Other objects and advantages of the present invention will appear throughout the following specification and claim.

In the drawings:

Figure 1 is a perspective view of a film holder illustrating the improved shielding plates carried thereby;

Figure 2 is a front elevational view of the holder illustrating the shielding plate in an extended or film exposing position;

Figure 3 is an end elevational view of the holder, certain parts being shown in section and illustrating the spring locking means;

Figure 4:
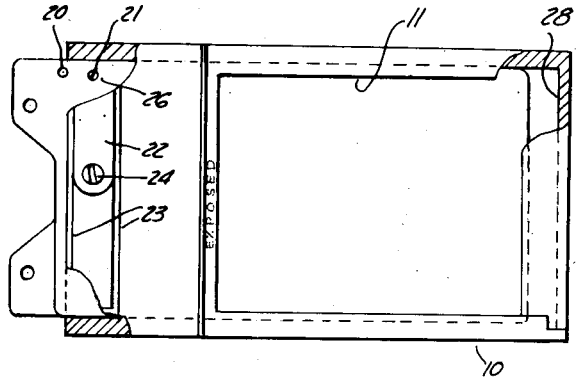
Figure 4 is a front elevational view of the holder showing the film shielding plate in a closed position.

By referring to the drawings, it will be seen that 10 designates the frame of a film holder of the conventional type commonly known as the "Press Camera Film Holder." The frame 10 is provided with a conventional film receiving socket 11 on each side thereof, as is common to this type of holder.

Figure 6:
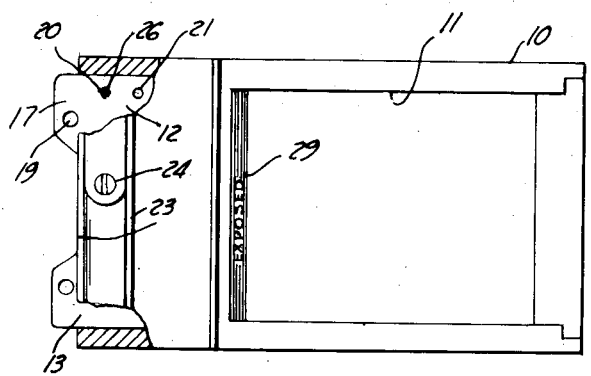
Figure 6 is a front elevational view of the holder showing the film shielding plate in a closed film exposed indicating position.
Figure 5:
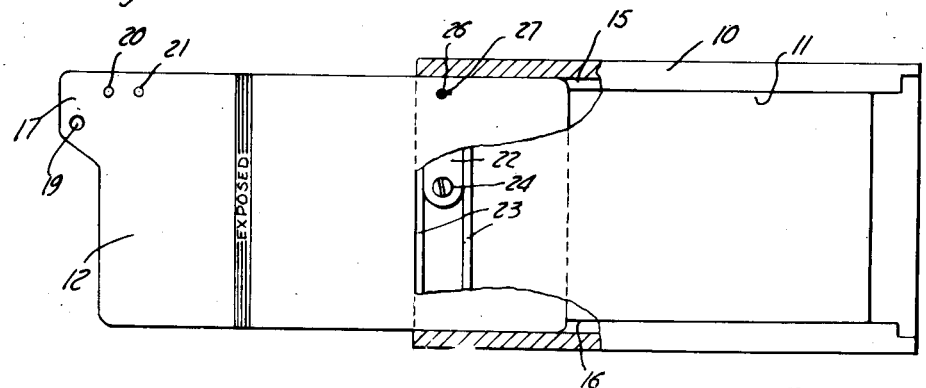
Figure 5 is a front elevational view of the holder showing the film shielding plate in a position to expose the film when the holder is mounted in a supporting camera.

A sliding film shielding or light shielding plate 12 is adapted to cover the film receiving socket on one side of the frame 10, and a second shielding plate 13 is adapted to cover the film receiving socket on the reverse side of the frame 10. Since the plates are of duplicate formation it is necessary to describe in detail the structure and operation of plate 12 only. The plate 12 comprises a relatively thin flat body which is slidably mounted within the slot 14 formed in one end of the frame and sliding in the longitudinally extending upper and lower channels 15 and 16 respectively above and below the film receiving socket 11, as shown in Figures 4, 5 and 6. The frame 10 may be varied as to its particular design or mechanical detail construction without departing from the spirit of the invention.

The plate 12 is provided with a finger gripping projection 17 at one end which normally projects beyond one end of the frame 10, as shown in Figure 1, when the plate 12 is in a closed or encased position. The plate 13 preferably is inserted in the opposite side of the holder 10 in an inverted position so that the finger gripping projection 18 will be in staggered relation to the projection 17 of the plate 12. An aperture 19 is formed in the projection 17 to facilitate gripping thereof by the fingers of an operator. A similar aperture also is formed in the projection 18.

Aligned apertures 20 and 21 are formed near one longitudinal edge of the plate 12, as shown. A spring locking or latching member 22 is secured to the outer face of the frame 10, preferably near one end thereof and preferably extends transversely of the frame. The spring locking or latching member 22 is anchored in position by means of an anchoring screw 24 between the parallel ribs 23 which are formed on the outer face frame 10. The screw 24 engages one end of the member 22 and the other end of the member 22 is free to be sprung away from the frame 10 by the finger of an operator as will be hereinafter described. The ribs 23 define a latching member receiving slot and the ribs 23 are beveled or rounded at the ends thereof, as indicated at 25, in Figure 3, to facilitate the engagement of the outer free end of the spring latching member 22 by the finger of an operator. A latching pin 26 is carried by the latching or locking member 22 and is adapted to extend through the frame 10 to selectively engage one of the apertures 20 or 21 to latch or lock the plate 12 in a selected position.

An aperture 27 is preferably aligned with the apertures 20 and 21, and is spaced therefrom a proper distance to be engaged by the pin 26 to hold the plate in an open position to expose the film in the film receiving socket in a manner as shown in Figure 5.

The operation of the device is as follows:

The plate 12 is moved to the position shown in Figure 5 to load the film in the socket 11 in a conventional manner. The pin 26 of the spring locking member 22 will engage the aperture 27 and hold the plate 12 in the open position until the spring locking member 22 is released. The pin 26 of the member 22 is released from engagement with the aperture 27 and the plate 12 is slidably moved to a closed position to cover the film which has been placed in the socket 11. The pin 26 will then engage the aperture 21 and hold the plate 12 in the closed position such as is shown in Figure 4, thereby indicating to the operator that the film has not been exposed. After the frame 10 has been placed in the camera C, shown in dotted lines in Figure 3, and held in position by the conventional camera back B, the member 22 is flexed outwardly to disengage the pin 26 from the aperture 21 and the plate 12 is pulled outwardly to the position shown in Figure 5, when the picture may be taken since the film is then exposed. After the film has been exposed by taking the picture, the plate 12 is moved inwardly to the position shown in Figure 6 in a manner whereby the pin 26 engages the aperture 20. This results in holding the plate in a closed position where the indicator line 29 marked "Exposed" is visible upon the plate 12. The operator then is advised that the film has been exposed. The plate 13 may be similarly operated on the reverse side of the frame 10 when taking a picture upon the film carried by the reverse side of the frame 10.

It should be noted that there is sufficient clearance, as at 28—see Figure 4—for the plate 12 to completely close the socket 11 when the pin 26 of the member 22 engages the aperture 21 and to allow the plate 12 to move further inwardly to allow the pin 26 to engage the aperture 20, thereby providing the two-step locking position of the plate 12. When the pin 26 engages the aperture 21, the indicating line marked "Exposed" lies under the frame or is covered thereby, as shown in Figure 4, but when the pin 26 engages the aperture 20 the line 29 is exposed to view within the socket 11 beyond the frame as explained above.

It should be noted that the locking or latching means may be located in various positions, and certain detail changes may be made without departing from the spirit of the invention, so long as these changes fall within the scope of the appended claim.

By means of the present invention, and because of the various stop positions of the plate 12 relative to the frame and the indicating means on the plate, such as the line 29, the danger of an operator in making a double exposure on the film will be reduced to a minimum.

Having described the invention, what I claim as new is:

In combination with a negative holding frame having a negative receiving portion provided with an exposure opening, a negative shielding plate movable to a plurality of selected positions within the frame and over the exposure opening to close said opening, cooperative latching elements carried by the frame and plate to positively hold the plate in a selected closed position within the frame and over the exposure opening, said plate carrying a visual indicating means which is visible in the exposure opening of the frame when the plate is moved by an operator to one position immediately after exposing the negative, and a fixed covering shield carried by the frame transversely adjacent one end of the exposure opening under which said visual indicator is adapted to be moved to cover said indicator when the plate is moved by an operator to another selected position when placing an unexposed negative in the frame before exposure of the negative.

YERVANT H. KURKJIAN.

REFERENCES CITED

The following references are of record in the file of this patent:

UNITED STATES PATENTS

| Number | Name | Date |
|---|---|---|
| 479,186 | Hare | July 19, 1892 |
| 484,569 | Pierce | Oct. 18, 1892 |
| 759,314 | Rosslow | May 10, 1904 |
| 1,195,062 | Miles | Aug. 15, 1916 |
| 1,954,917 | Burnell | Apr. 17, 1934 |
| 2,462,683 | Schwartz | Feb. 22, 1949 |

FOREIGN PATENTS

| Number | Country | Date |
|---|---|---|
| 244,023 | Germany | Feb. 28, 1912 |